United States Patent
Knipfer et al.

(10) Patent No.: US 8,244,644 B2
(45) Date of Patent: Aug. 14, 2012

(54) SUPPLY CHAIN MULTI-DIMENSIONAL SERIAL CONTAINMENT PROCESS

(75) Inventors: Ivory Wellman Knipfer, Rochester, MN (US); Jeffrey George Komatsu, Kasson, MN (US); Jason Scott Lee, Oronoco, MN (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1498 days.

(21) Appl. No.: 11/672,355

(22) Filed: Feb. 7, 2007

(65) Prior Publication Data

US 2008/0189150 A1 Aug. 7, 2008

(51) Int. Cl.
*G06Q 10/00* (2012.01)
(52) U.S. Cl. ........................................ 705/303; 705/305
(58) Field of Classification Search .................. 705/1.1, 705/7, 8, 9, 28, 29, 302, 303, 305, 308, 500
See application file for complete search history.

(56) References Cited

U.S. PATENT DOCUMENTS

| | | | |
|---|---|---|---|
| 5,673,194 A | 9/1997 | Cipelletti et al. | |
| 6,266,436 B1 | 7/2001 | Bett et al. | |
| 6,301,517 B1 | 10/2001 | Doran et al. | |
| 6,615,096 B1 | 9/2003 | Durrant et al. | |
| 6,988,017 B2 | 1/2006 | Pasadyn et al. | |
| 7,133,914 B1 * | 11/2006 | Holbrook | 709/224 |
| 7,181,383 B1 * | 2/2007 | McGaughy et al. | 703/14 |
| 7,242,992 B2 * | 7/2007 | Takahashi et al. | 700/97 |
| 2002/0188424 A1 * | 12/2002 | Grinstein et al. | 702/183 |
| 2002/0194196 A1 * | 12/2002 | Weinberg et al. | 707/104.1 |
| 2004/0220689 A1 | 11/2004 | Mathur et al. | |
| 2005/0004811 A1 * | 1/2005 | Babu | 705/1 |
| 2006/0059262 A1 * | 3/2006 | Adkinson et al. | 709/225 |
| 2006/0277059 A1 * | 12/2006 | J'maev et al. | 705/1 |
| 2007/0129953 A1 * | 6/2007 | Cunningham et al. | 705/1 |
| 2007/0150501 A1 * | 6/2007 | Gilson | 707/101 |
| 2007/0203716 A1 * | 8/2007 | Bolch et al. | 705/1 |

* cited by examiner

*Primary Examiner* — Gerardo Araque, Jr.
*Assistant Examiner* — David S Easwaran
(74) *Attorney, Agent, or Firm* — Yee & Associates, P.C.; Steven L. Bennett

(57) ABSTRACT

A computer implemented method, an apparatus, and computer usable program product for containing a defective product across a supply chain is provided. A data processing system receives a notice from a source supplier that a product is defective. The data processing system identifies an exposure level associated with the defective product, wherein the exposure level comprises a list of affected assemblies and a range of serial numbers associated with the affected assemblies. Responsive to identifying the exposure level, the data processing system notifies each supplier in the supply chain of the defective product.

18 Claims, 11 Drawing Sheets

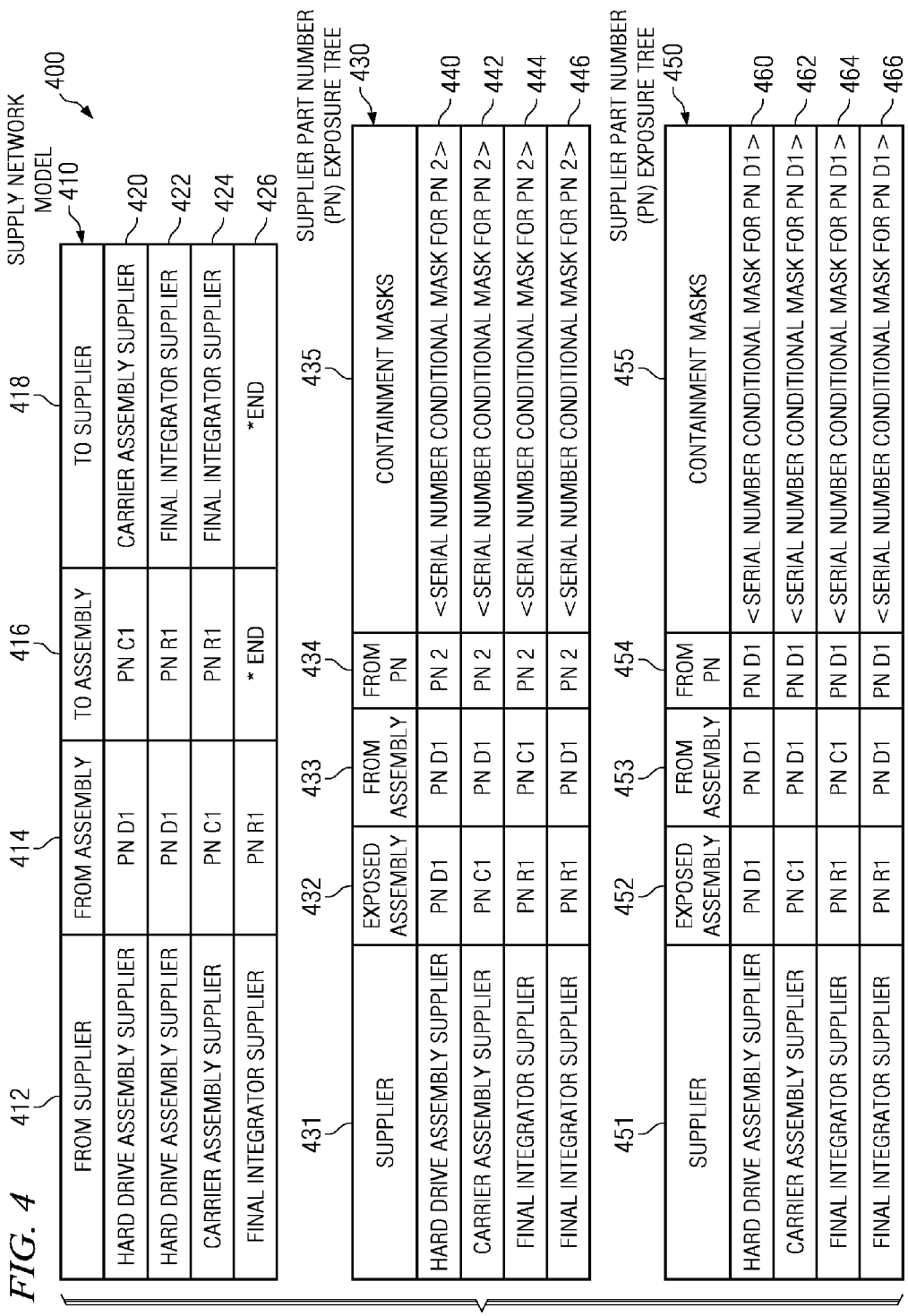

| | 701 | 702 | 703 | 704 | 705 | 706 | 707 | 708 | 709 | 710 |
|---|---|---|---|---|---|---|---|---|---|---|
| 700 → | SEQUENCE OF EVENTS | SUPPLIER | PRODUCT (EXPOSED ASSEMBLY) | FROM ASSEMBLY | PART NUMBER (FROM PN) | RANGE START | RANGE END | ALGORITHM | GOOD/ BAD (G/B) | CONDITIONAL CHECK |
| 712 → | CALL FROM HARD DRIVE ASSEMBLY SUPPLIER WITH SUSPECT PN 2 | HARD DRIVE ASSEMBLY SUPPLIER | PN D1 | PN D1 | PN 2 | 100 | 400 | NUMERIC | B | |
| 714 → | CALL FROM HARD DRIVE ASSEMBLY SUPPLIER WITH SUSPECT D1 | HARD DRIVE ASSEMBLY SUPPLIER | PN D1 | PN D1 | PN D1 | 005 | 929 | NUMERIC | G | |

*FIG. 7A*

| SERIAL NUMBER MASK PROGRESSION 730 | SUPPLIER | PRODUCT (EXPOSED ASSEMBLY) | NEW REFERENCE FIELD (FROM ASSEMBLY) | PART NUMBER (FROM PN) | RANGE START | RANGE END | ALGORITHM | GOOD/ BAD (G/B) | CONDITIONAL CHECK |
|---|---|---|---|---|---|---|---|---|---|
| 731 | HARD DRIVE ASSEMBLY SUPPLIER | PN D1 | PN D1 | PN 2 | *BEGIN | 99 | NUMERIC | G | |
| 732 | HARD DRIVE ASSEMBLY SUPPLIER | PN D1 | PN D1 | PN 2 | 100 | 400 | NUMERIC | B | |
| 733 | HARD DRIVE ASSEMBLY SUPPLIER | PN D1 | PN D1 | PN 2 | 401 | *END | NUMERIC | G | |
| 734 | CARRIER ASSEMBLY SUPPLIER | PN C1 | PN C1 | PN 2 | *BEGIN | 99 | NUMERIC | G | |
| 735 | CARRIER ASSEMBLY SUPPLIER | PN C1 | PN C1 | PN 2 | 100 | 400 | NUMERIC | B | |
| 736 | CARRIER ASSEMBLY SUPPLIER | PN C1 | PN C1 | PN 2 | 401 | *END | NUMERIC | G | |
| 737 | FINAL INTEGRATOR SUPPLIER | PN R1 | PN C1 | PN 2 | *BEGIN | 99 | NUMERIC | G | |
| 738 | FINAL INTEGRATOR SUPPLIER | PN R1 | PN C1 | PN 2 | 100 | 400 | NUMERIC | B | |
| 739 | FINAL INTEGRATOR SUPPLIER | PN R1 | PN C1 | PN 2 | 401 | *END | NUMERIC | G | |
| 740 | FINAL INTEGRATOR SUPPLIER | PN R1 | PN D1 | PN 2 | *BEGIN | 99 | NUMERIC | G | |
| 741 | FINAL INTEGRATOR SUPPLIER | PN R1 | PN D1 | PN 2 | 100 | 400 | NUMERIC | B | |
| 742 | FINAL INTEGRATOR SUPPLIER | PN R1 | PN D1 | PN 2 | 401 | *END | NUMERIC | G | |

FIG. 7B

| SERIAL NUMBER MASK PROGRESSION 750 | SUPPLIER | PRODUCT (EXPOSED ASSEMBLY) | NEW REFERENCE FIELD (FROM ASSEMBLY) | PART NUMBER (FROM PN) | RANGE START | RANGE END | ALGORITHM | GOOD/ BAD (G/B) | CONDITIONAL CHECK |
|---|---|---|---|---|---|---|---|---|---|
| 731 | HARD DRIVE ASSEMBLY SUPPLIER | PN D1 | PN D1 | PN D1 | *BEGIN | 004 | NUMERIC | B | |
| 732 | HARD DRIVE ASSEMBLY SUPPLIER | PN D1 | PN D1 | PN D1 | 005 | 929 | NUMERIC | G | |
| 733 | HARD DRIVE ASSEMBLY SUPPLIER | PN D1 | PN D1 | PN D1 | 930 | *END | NUMERIC | B | |
| 734 | CARRIER ASSEMBLY SUPPLIER | PN C1 | PN D1 | PN D1 | *BEGIN | 004 | NUMERIC | B | |
| 735 | CARRIER ASSEMBLY SUPPLIER | PN C1 | PN D1 | PN D1 | 005 | 929 | NUMERIC | G | |
| 736 | CARRIER ASSEMBLY SUPPLIER | PN C1 | PN D1 | PN D1 | 930 | *END | NUMERIC | B | |
| 737 | FINAL INTEGRATOR SUPPLIER | PN R1 | PN C1 | PN D1 | *BEGIN | 004 | NUMERIC | B | |
| 738 | FINAL INTEGRATOR SUPPLIER | PN R1 | PN C1 | PN D1 | 005 | 929 | NUMERIC | G | |
| 739 | FINAL INTEGRATOR SUPPLIER | PN R1 | PN C1 | PN D1 | 930 | *END | NUMERIC | B | |
| 740 | FINAL INTEGRATOR SUPPLIER | PN R1 | PN D1 | PN D1 | *BEGIN | 004 | NUMERIC | B | |
| 741 | FINAL INTEGRATOR SUPPLIER | PN R1 | PN D1 | PN D1 | 005 | 929 | NUMERIC | G | |
| 742 | FINAL INTEGRATOR SUPPLIER | PN R1 | PN D1 | PN D1 | 930 | *END | NUMERIC | B | |

*FIG. 7C*

SUPPLY CHAIN MULTI-DIMENSIONAL SERIAL CONTAINMENT PROCESS

CROSS-REFERENCE TO RELATED APPLICATION

The present application is related to co-pending and commonly assigned U.S. patent application Ser. No. 11/672,340, filed on Feb. 7, 2007, and entitled "Multi-Dimensional Serial Containment Process", which application is incorporated herein by reference, issued as U.S. Pat. No. 7,716,230.

BACKGROUND OF THE INVENTION

1. Field of the Invention

The present invention relates generally to a data processing system and, more particularly, to a data processing system for a supply chain. Still yet more particularly, the present invention relates to a computer implemented method, an apparatus, and computer usable program product for containing a defective product across a supply chain.

2. Description of the Related Art

Due to outsourcing and globalization, the end products of a growing number of industries include components and assemblies that are built across the globe by multiple suppliers. The situation is particularly applicable in the computer industry where end products may include many thousands of parts assembled by a tiered hierarchy of suppliers.

Problems often arise when defective components pass from one level to another in the supply chain. The situation can sometimes be further exacerbated when the defective component reaches the final system integrator. When an issue is discovered, an attempt to contain a product across multiple suppliers is a time consuming, tedious task. The problem is further complicated since each supplier may provide only a portion of information about the serial numbers that are exposed and include defective parts. When a problem is identified, real-time containment across the supply chain is important. Without timely, robust containment and control of the affected product, defective products will be shipped to customers, thereby driving up warranty costs and directly impacting availability and customer satisfaction.

Several known solutions exist to provide containment across a supply chain. One known solution is manual notification to each supplier affected by the exposed parts. The notification typically results in each supplier invoking manual containment methods. However, this solution is inherently impractical and non-responsive, usually resulting in suspect parts being sent further down the supply chain. Furthermore, this solution depends on each supplier in the supply chain communicating to the next supplier in the supply chain, which often results in suppliers failing to communicate problems to each other.

Another solution is to have the final integrator supplier be the only containment implementer. Thus, containment is only performed by the final integrator supplier and no other supplier upstream of the integrator. However, this solution results in the final integrator supplier bearing the cost of reworking and returning a defective product. Furthermore, the additional time to rework and return the defective product usually results in delayed customer orders.

BRIEF SUMMARY OF THE INVENTION

A computer implemented method, an apparatus, and a computer usable program product for containing a defective product across a supply chain is provided. A data processing system receives a notice from a source supplier that a product is defective. The data processing system identifies an exposure level associated with the defective product, wherein the exposure level comprises a list of affected assemblies and a range of serial numbers associated with the affected assemblies. Responsive to identifying the exposure level, the data processing system notifies each supplier in the supply chain of the defective product.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 illustrates a containment model, in accordance with an illustrative embodiment;

FIGS. 7A, 7B, and 7C are an example of the flattening algorithm process, in which an illustrative embodiment may be implemented;

DETAILED DESCRIPTION OF THE INVENTION

Figure 1:
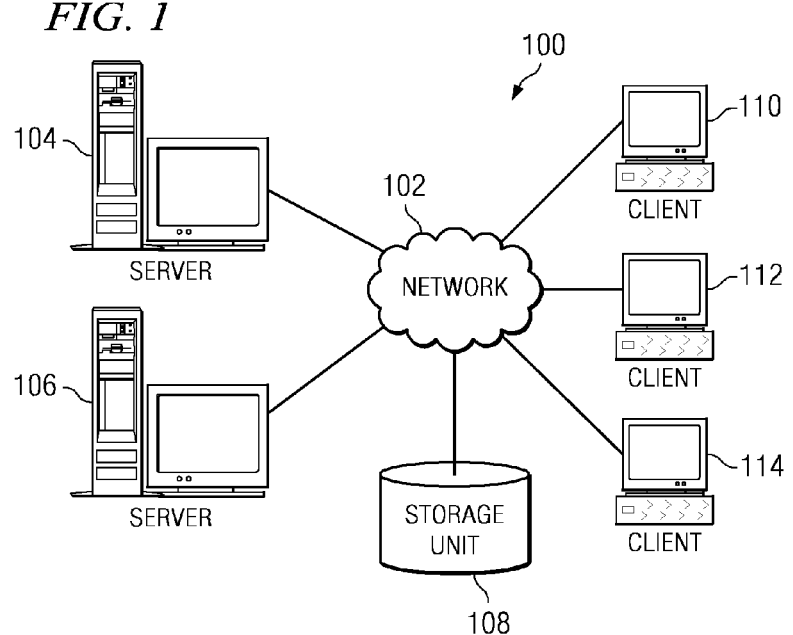
FIG. 1 is a pictorial representation of a network of data processing systems, in which illustrative embodiments may be implemented.
Figure 2:
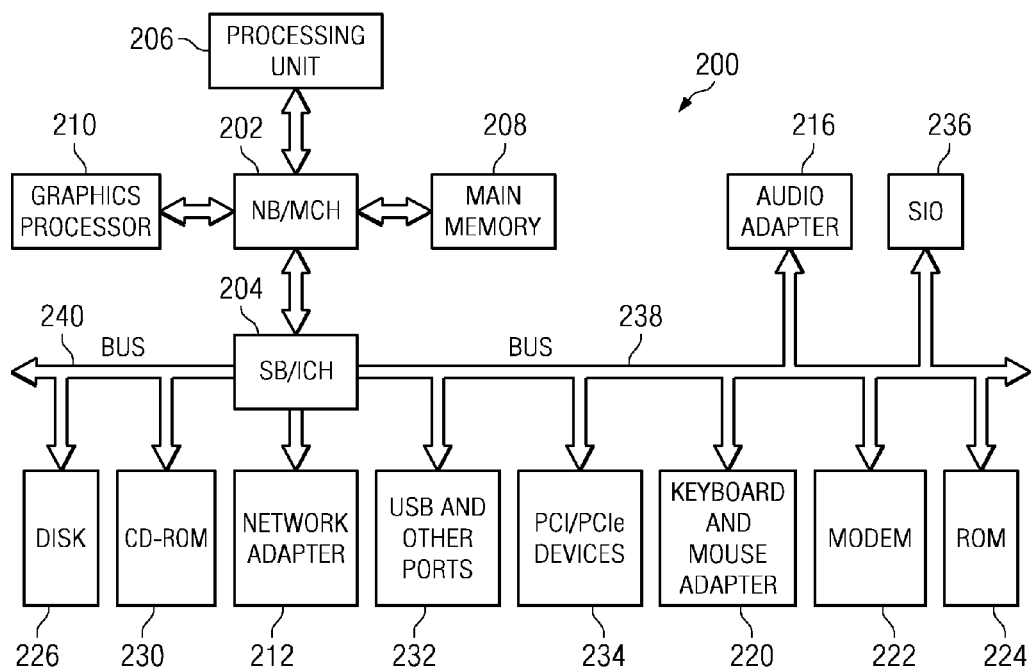
FIG. 2 is a block diagram of a data processing system, in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processing systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP. Microsoft and Windows are trademarks of Microsoft Corporation in the United States, other countries, or both. An object-oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and the above-described examples are not meant to imply architectural limitations. For example, data processing system 200 also may be a tablet computer, a laptop computer, or a telephone device in addition to taking the form of a PDA.

The illustrative embodiments provide a computer implemented method, an apparatus, and a computer usable program product for containing a defective product across a supply chain. A data processing system receives a notice from a source supplier that a product is defective. The data processing system identifies an exposure level associated with the defective product. The exposure level includes a list of affected assemblies and a range of serial numbers associated with the affected assemblies.

To identify the exposure level, the data processing system determines which suppliers in the supply chain and which assemblies produced by the suppliers are affected by the defective product. To determine which suppliers and which assemblies are affected, the data processing system identifies a node in a supplier network for each supplier affected by the defective product. The data processing system then searches through the supplier network until an end of the supply chain is identified. The data processing system then records each supplier and the assemblies affected by the defective product to form a list of exposed suppliers and a list of exposed assemblies. The data processing system then identifies a "from" assembly from which the exposed assemblies are formed. The data processing system then identifies a part number for the defective product.

To continue identifying the exposure level, the data processing system then applies a flattening algorithm to the list of affected assemblies and the range of serial numbers. The flattening algorithm involves three steps: (1) creating a base range of serial numbers; (2) splitting the range of serial numbers; and (3) merging adjacent ranges of serial numbers. The application of the range flattening algorithm forms a serial mask that identifies a narrowed range of serial numbers. The data processing system can then apply a conditional algorithm to the range of serial numbers to narrow the range of serial numbers. The application of the conditional mask algorithm forms conditional mask results. The data processing system then validates the serial mask against the conditional mask results.

After identifying the exposure level, the data processing system notifies each supplier in the supply chain of the defective product. To notify, the data processing system identifies a containment mask that narrows the exposure level to a part number for the defective product. Then, the containment mask is applied to the range of serial numbers to form a narrowed range of serial numbers. The narrowed range of serial numbers is then communicated to the suppliers. In one embodiment, the suppliers are only notified after the exposure level is identified. In another embodiment, the suppliers are also notified when each step of the flattening algorithm is applied to the range of serial numbers. Additionally, in one embodiment, the suppliers are notified by using a form of a serial number stored in the data processing system. In another embodiment, the suppliers are notified by using a form of serial numbers which is unique to each supplier.

Figure 3:
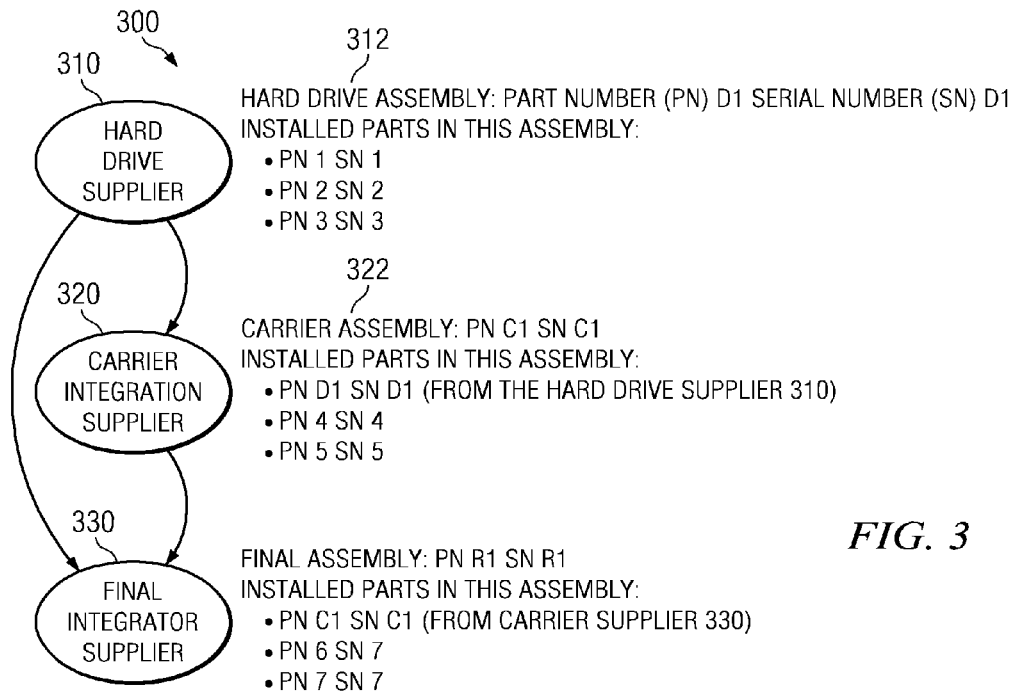
FIG. 3 is an example supply chain, in accordance with an illustrative embodiment.

FIG. 3 is an example supply chain, in accordance with an illustrative embodiment. Supply chain 300 is a series of suppliers which provides assemblies or parts to downstream suppliers. A supplier is any business entity which assembles and makes a particular component or part. A part is an individual component or device which exists prior to being assembled into another component or assembly. An assembly is a group of different parts which are physically connected to each other or are associated with each other.

Supply chain 300 includes hard drive supplier 310, carrier integration supplier 320, and final integrator supplier 330. In the illustrative embodiment, the suppliers of supply chain 300 can communicate with each other using any data processing system, such as client 110, 112, or 114 of FIG. 1 or data processing system 200 of FIG. 2. Additionally, each supplier within supply chain 300 can also be connected to each other via a network, similar to network 102 of FIG. 1. However, in alternative embodiments, each supplier in supply chain 300 can also communicate with each other via postal mail or telephone.

In the illustrative embodiment, hard drive supplier 310 supplies hard drives to both carrier integration supplier 320 and final integrator supplier 330. Hard drive supplier 310 is an upstream supplier to carrier integration supplier 320 and final integrator supplier 330 because both business entities receive parts or assemblies from hard drive supplier 310. Likewise, carrier integration supplier 320 and final integrator supplier 330 are downstream suppliers to hard drive supplier 310, because hard drive supplier 310 sends parts or assemblies to the two business entities. In similar fashion, carrier integration supplier 320 is upstream to final integrator supplier 330 because final integrator supplier 330 receives parts or assemblies from carrier integration supplier 320. Likewise, final integrator supplier 330 is downstream to carrier integration supplier 320.

In the illustrative embodiment, hard drive supplier 310 creates hard drive assembly 312, which has a part number (PN) "D1" and a serial number (SN) "D1". Hard drive assembly 312 includes three installed parts: (1) PN "1" with a SN "1"; (2) PN "2" with a SN "2"; and (3) PN "3" with a SN "3".

In the illustrative embodiment, each part and assembly has an assigned part number. The part number is a way of easily identifying a part using a number instead of a name. A serial number is a string of characters that provides specific identification information for a particular product. The string of characters can be any combination of letters, numbers, and symbols. For example, a serial number can include, but is not limited to, a manufacturing date, a manufacturing time, the equipment number that processed the product, or the expiration date for the product. In quality control circumstances, a serial number is used to sort and identify products, and, in particular, isolate and contain defective products.

In the illustrative embodiment, hard drive supplier 310 and the parts within hard drive supplier 310 use both a part number and a serial number to identify hard drive assembly 312. Additionally, in the illustrative embodiment, hard drive assembly 312 as well as the parts within hard drive assembly 312 have a part number that is the same as the serial number. However, in alternative embodiments, hard drive supplier 310 can use only the part number or the serial number to identify the assembly and the individual parts. Additionally, in an alternative embodiment, the part numbers and serial numbers can differ for each part and assembly.

Hard drive supplier 310 provides hard drive assembly 312 to carrier integration supplier 320 and final integrator supplier 330. Carrier integration supplier 320 is an intermediate supplier, which takes a part or assembly from another supplier, such as hard drive supplier 310, and uses the part or assembly to build another assembly. Carrier integration supplier 320 receives hard drive assembly 312 and integrates hard drive assembly 312 into carrier assembly 322. For example, in use, consider that carrier assembly 322 is a hard drive assembly that has rails attached to hard drive assembly 312. The rails are used to slide and affix the hard drive assembly 312 into a data processing system or a computer. Carrier integration supplier 320, therefore, receives hard drive assembly 312 and integrates or attaches the rails to hard drive assembly 312 using a connection device, such as a screw. In the illustrative embodiment, the hard drive assembly 312 with the attached rails forms carrier assembly 322.

In the illustrative embodiment, carrier assembly 322 has a part number "C1" and a serial number "C1". Carrier assembly 322 includes three parts: (1) hard drive assembly 312 with PN "D1" and SN "D1"; (2) PN "4" with SN "4"; and (3) PN "5" with SN "5". Carrier integration supplier 320 provides carrier assembly 322 to final integrator supplier 330.

In the illustrative embodiment, final integrator supplier 330 is a supplier which builds the final product used to sell to a customer. In the illustrative embodiment, final integrator supplier 330 assembles the assemblies from both hard drive supplier 310 and carrier integration supplier 320. In the illustrated example, final integrator supplier 330 supplier accepts hard drive assembly 312 from hard drive supplier 310 because final integrator supplier 330 has the capability of building carrier assembly 322, similar to carrier integration supplier 320. Additionally, final integrator supplier 330 also stores back-up or replacement parts for warranty purposes or for quality assurance purposes. In an alternative embodiment, final integrator supplier 330 may not receive hard drive assembly 312 from hard drive supplier 310 and may only receive carrier assembly 322 from carrier integration supplier 320.

The illustrative embodiments are not limited to the illustrative example. For example, supply chain 300 can include more or fewer suppliers. Additionally, the suppliers in supply chain 300 can provide and integrate a number of different products. Additionally, supply chain 300 can apply to any product that receives parts or components from another supplier.

FIG. 4 illustrates a containment model, in accordance with an illustrative embodiment. Containment model 400 illustrates the exposure of a downstream supplier when a defective part is identified. Containment model 400 follows the supply chain model illustrated in supply chain 300 of FIG. 3. Containment model 400 can be executed in the processing unit of a data processing system, similar to processing unit 206 of FIG. 2.

Containment model 400 includes supply network model 410, supplier part number (PN) exposure tree 430, and supplier part number (PN) exposure tree 450. Supply network model 410 illustrates a relationship between part numbers and suppliers in a supply chain. In the illustrative embodiment, supply network model 410 includes from supplier column 412, from assembly column 414, to assembly column 416, and to supplier column 418. From supplier column 412 lists the immediate upstream supplier for a particular assembly or part. The immediate upstream supplier is the supplier that directly provides the particular assembly or part. From assembly column 414 is the part number of the assembly which the upstream supplier provided. To assembly column 426 is the part number of the assembly into which the receiving supplier integrated the part number listed in from assembly column 414. To supplier column 418 is the downstream supplier to which the supplier listed in from supplier column 412 supplied the part number listed in from assembly column 414. An "*END" in column 418 indicates that the supplier listed in from supplier column 412 in the same row as the "*END" is the final integrator of the product.

Lines 420 through 426 are entries which list a relationship between an assembly part number and a supplier. In line 420, supply network model 410 indicates that the hard drive assembly supplier provides PN "D1" to the carrier assembly supplier, who then integrates PN "D1" into PN "C1". In line 422, supply network model 410 indicates that the hard drive assembly supplier also supplies PN "D1" to the final integrator supplier, who then integrates PN "D1" into PN "R1". In line 424, supply network model 410 indicates that the carrier assembly supplier then provides PN "C1" to the final integrator supplier, who then integrates the part into PN "R1". In line 426, supply network model 410 indicates that the final integrator supplier assembles PN "R1". "R1" is the final product since no supplier is listed in to supplier column 418 and "*END" is listed in to supplier column 418 for line 426.

Supplier PN exposure trees 430 and 450 illustrate two situations in which information is disseminated to suppliers in the supply chain when a defective product is identified. In the illustrative embodiments, a defective product is a product that does not meet a quality standard and is outside the tolerable specification limits for the quality standard. A product can be defective for a number of reasons, including but not limited to situations when the product is missing components, includes too much of a single ingredient, includes the wrong ingredient, is mislabeled, or is dimensioned incorrectly.

Supplier PN exposure trees 430 and 450 include, respectively, supplier columns 431 and 451, exposed assembly columns 432 and 452, from assembly columns 433 and 453, from part number (PN) columns 434 and 454, and containment masks columns 435 and 455. Supplier columns 431 and 451 indicate the supplier that builds the assembly listed in exposed assembly columns 432 and 452, respectively. Exposed assembly columns 432 and 452 indicate the assembly number which includes the assembly that includes the defective part listed in from PN columns 434 and 454, respectively. From assembly columns 433 and 453 list the part number of the assembly which includes the defective part. From PN columns 434 and 454 list the part number of the defective part.

Containment masks column 435 and 455 lists the conditional mask generated to search for the exposed assembly listed in exposed assembly columns 432 and 452. A mask is a comparison between two things, and, in the illustrative embodiment, the containment mask compares the serial number of the part numbers to identify which serial numbers are associated with the defective part. In the illustrative embodiment, containment model 400 includes two types of masks: (1) serial masks and (2) conditional masks. A serial mask identifies a range of serial numbers for good products and a range of serial numbers for defective products. A conditional mask applies business-specific parameters to the range of serial numbers in order to narrow the identification of the defective product. A containment mask is a type of conditional mask. In the illustrative embodiment, the containment mask listed in containment masks column 435 is a "serial number conditional mask for PN 2". Specifically, the containment mask is the set of instructions for identifying and containing a defective product.

In the illustrative embodiment, supplier PN exposure tree 430 illustrates a scenario in which the hard drive supplier notifies the final integrator supplier that PN "2" is defective. In this scenario, the hard drive supplier has no other specific information other than the identification of a part number. Based on supply network model 410, containment model 400 generates supplier PN exposure tree 430 with lines 440 through 446 as entries. In line 440, supplier PN exposure tree 430 indicates that hard drive assembly supplier has exposed assembly PN "D1", which is built from PN "D1" which includes PN "2". Exposed assembly column 432 and from assembly column 433 in line 440 are the same in this embodiment because the hard drive assembly supplier is the first supplier to use PN "2" and is, thus, the first supplier affected by defective PN "2". In line 442, supplier PN exposure tree 430 indicates that the carrier assembly supplier is also exposed because assembly PN "C1" includes PN "D1" which includes defective PN "2". In lines 444 and 446, supplier PN exposure tree 430 indicates that PN "R1" at the final integrator supplier is exposed. The final integrator supplier is exposed to the defective part from both the hard drive assembly supplier and the carrier assembly supplier. Thus, line 444 indicates that PN "R1" is from assembly "C1" which is from the carrier assembly supplier, while line 446 indicates that PN "R1" is from assembly "D1" which is from the hard drive assembly supplier.

In another scenario in the illustrative embodiment, supplier PN exposure tree 450 illustrates a scenario in which the hard drive assembly supplier indicates that only "D1" assemblies that include PN "2" are defective. Therefore, from PN column 454 indicates PN "D1" as the defective assembly. Thus, in line 460, the "D1" assembly is the exposed assembly for the hard drive assembly supplier. In line 462, the "C1" assembly is the exposed assembly for the carrier assembly supplier. For the final integrator supplier, lines 464 and 466 indicate that the "R1" assembly is exposed because the "R1" assembly is formed using PN "C1" and PN "D1".

The illustrative embodiments are not limited to the illustrated example. For example, containment model 400 can include more or fewer suppliers. Additionally, containment model 400 can list serial numbers instead of part numbers. Furthermore, supply network model 410 can use a saved bill of materials as the basis for the data used in supply network model 410. Moreover, in some embodiments, the final integrator supplier can receive assemblies and parts only from the hard drive supplier. Furthermore, the containment model does not need to be applied to any intermediary supplier not affected by the defective product.

Figure 5:
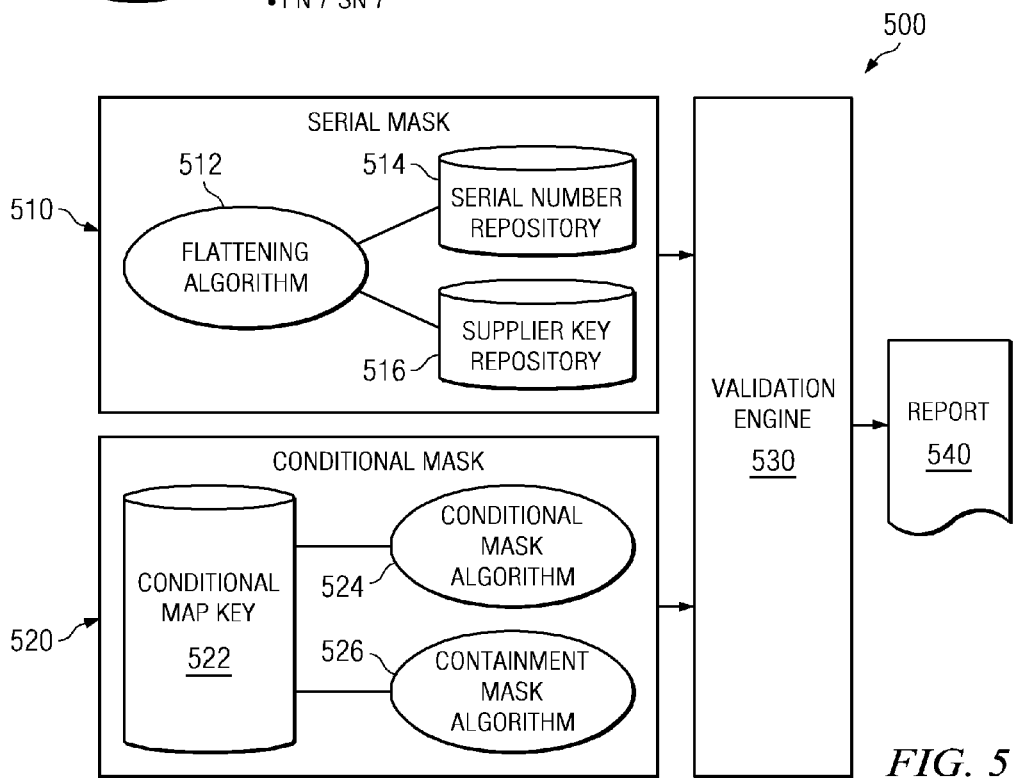
FIG. 5 illustrates a defective product identification system, in accordance with an illustrative embodiment.

FIG. 5 illustrates a defective product identification system, in accordance with an illustrative embodiment. Data processing system 500 is a system for identifying a defective product for a supplier. The supplier is any business entity, including but not limited to a manufacturing environment, a warehousing or storage environment, or any other business entity that receives, manufactures, or supplies goods to another business entity.

Data processing system 500 can be implemented as clients 110, 112, or 114 of FIG. 1 or as data processing system 200 of FIG. 2. Data processing system 500 includes serial mask 510, conditional mask 520, validation engine 530, and report 540. In the illustrative embodiment, the components within data processing system 500 are a software only embodiment. However, in alternative embodiments, the components can be a hardware only embodiment or a combination of software and hardware embodiments.

Serial mask 510 identifies a range of serial numbers for good products and a range of serial numbers for defective products. A mask is a comparison between two things, and, in the illustrative embodiment, serial mask 510 is a comparison between two ranges of serial numbers. In the illustrative embodiment, a range of serial numbers can be a single serial number or a plurality of serial numbers. Typically, if the range of serial numbers is a plurality of serial numbers, then the range of serial numbers is a group of consecutive serial numbers.

Serial mask 510 includes flattening algorithm 512, serial number repository 514, and supplier key repository 516. Serial mask 510 uses flattening algorithm 512 to identify and sort good products from defective products. Flattening algorithm 512 is a sequential series of instructions that narrows and specifically quantifies which product is defective. In the illustrative embodiments, to flatten means to narrow or make a range smaller. Flattening algorithm 512 can be executed in a processing unit, similar to processing unit 206 of FIG. 2.

Serial number repository 514 connects to flattening algorithm 512 and is a data element which lists the serial numbers for all products produced and used by a particular supplier. When a product is found to be defective, serial number repository 514 includes a list of identified defective products and a list of good products. Serial number repository 514 can be implemented using the main memory of data processing system 500, similar to main memory 208 of FIG. 2, or using the hard disk drive of data processing system 500, similar to hard disk drive 226 of FIG. 2. Serial number repository 514 can list data in any number of forms, including but not limited to a table, a flat file, an Extensible Markup Language (XML) file, a relational database management system, or any combination thereof. In the illustrative embodiment, serial number repository 514 lists data in a table.

Supplier key repository 516 lists the relationship between suppliers, assemblies, and part numbers in a supply chain. Supplier key repository 516 is a data element that includes tables similar to supply network model 410, supplier PN exposure tree 430, and supplier PN exposure tree 450 of FIG. 4. Supplier key repository 516 can be implemented using the main memory of data processing system 500, similar to main memory 208 of FIG. 2, or using the hard disk drive of data processing system 500, similar to hard disk drive 226 of FIG. 2. Supplier key repository 516 can list data in any number of forms, including but not limited to a table, a flat file, an Extensible Markup Language (XML) file, a relational database management system, or any combination thereof. In the illustrative embodiment, supplier key repository 516 lists data in a table.

Conditional mask 520 provides the capability of identifying serial numbers that are business-entity specific. In general, serial numbers vary widely from supplier to supplier, with each supplier using a different combination of letters and numbers to define a different attribute of a product. Conditional mask 520 accommodates the variations in serial numbers so that the identification of a particular lot or group of products can be easily identified.

Conditional mask 520 includes conditional map key 522, conditional mask algorithm 524, and containment mask algorithm 526. Conditional map key 522 is a name tag that identifies a specific type of serial number. Conditional map key 522 is a data element and includes a library or listing of map keys or name tags. Conditional map key 522 can be implemented using the main memory of data processing system 500, similar to main memory 208 of FIG. 2, or using the hard disk drive of data processing system 500, similar to hard disk drive 226 of FIG. 2. Conditional map key 522 can list data in any number of forms, including but not limited to a table, a flat file, an Extensible Markup Language (XML) file, a relational database management system, or any combination thereof. In the illustrative embodiment, conditional map key 522 maintains a list of map keys in a table.

Conditional mask algorithm 524 is a sequential series of instructions used to narrow a range of serial numbers using a supplier specific serial number. Conditional mask algorithm 524 can be implemented in a processing unit, similar to processing unit 206 of FIG. 2. Conditional mask algorithm 524 narrows the range of serial numbers by identifying specific features within a serial number, such as an individual or range of numbers, characters, or letters in a particular position in the serial number. Conditional mask algorithm 524 allows for several different types of numerical algorithms to be used, including but not limited to a numeric, binary, base octal, or hexadecimal algorithm. Conditional mask algorithm 524 also allows for Boolean algorithms to be used, thereby allowing for narrowing based on required and optional conditions.

In the illustrative embodiment, conditional mask 520 also includes containment mask algorithm 526. Containment mask algorithm 526 is similar to conditional mask algorithm 524, except that containment mask algorithm 526 includes a list of part numbers associated with the serial numbers. Conditional mask algorithm 524 is based on a range of serial numbers. Suppliers specify features within the range of serial numbers that help to identify and contain assemblies affected by the defective product. Containment mask algorithm 526 adds the additional feature by relating a part number to the range of serial numbers.

Validation engine 530 is connected to serial mask 510 and conditional mask 520. Validation engine 530 can be executed in a processor unit, similar to processing unit 206 of FIG. 2. Validation engine 530 compares the data processed by serial mask 510 to the data processed by conditional mask 520. In comparing, validation engine 530 determines whether a discrepancy exists between the data from serial mask 510 and the data from conditional mask 520. Specifically, validation engine 530 determines whether there is a conflict between which ranges of serial numbers are considered good products and which ranges of serial numbers are considered defective products. In the illustrative embodiment, the conclusions drawn from conditional mask 520 take priority over the determinations made by serial mask 510. In other words, if conditional mask 520 identifies a particular product in a range of serial numbers as defective while serial mask 510 identifies the product in the same range of serial numbers as good, then validation engine 530 will use the determination of conditional mask 520 and identify the product in the range of serial numbers as defective. Validation engine 530 applies the same logic to products conditional mask 520 considers good when serial mask 510 considers the product defective.

Report 540 is a summary of the results resulting from the analysis done by validation engine 530. Validation engine 530 creates report 540 and transmits report 540 to a final integrator supplier and to the suppliers in a supplier network. Report 540 can include a variety of information, including but not limited to a list of serial numbers of defective products, a list of serial numbers of good products, the location of the defective and good products, and the suppliers of the defective and good products. Report 540 can be presented in a variety of forms, including but not limited to a table, database, or text document.

The illustrative embodiments are not limited to the illustrative examples. For example, data processing system 500, serial mask 510, and conditional mask 520 may include more or fewer components. Additionally, report 540 may be disseminated to some or none of the suppliers in the supplier network.

Figure 6:
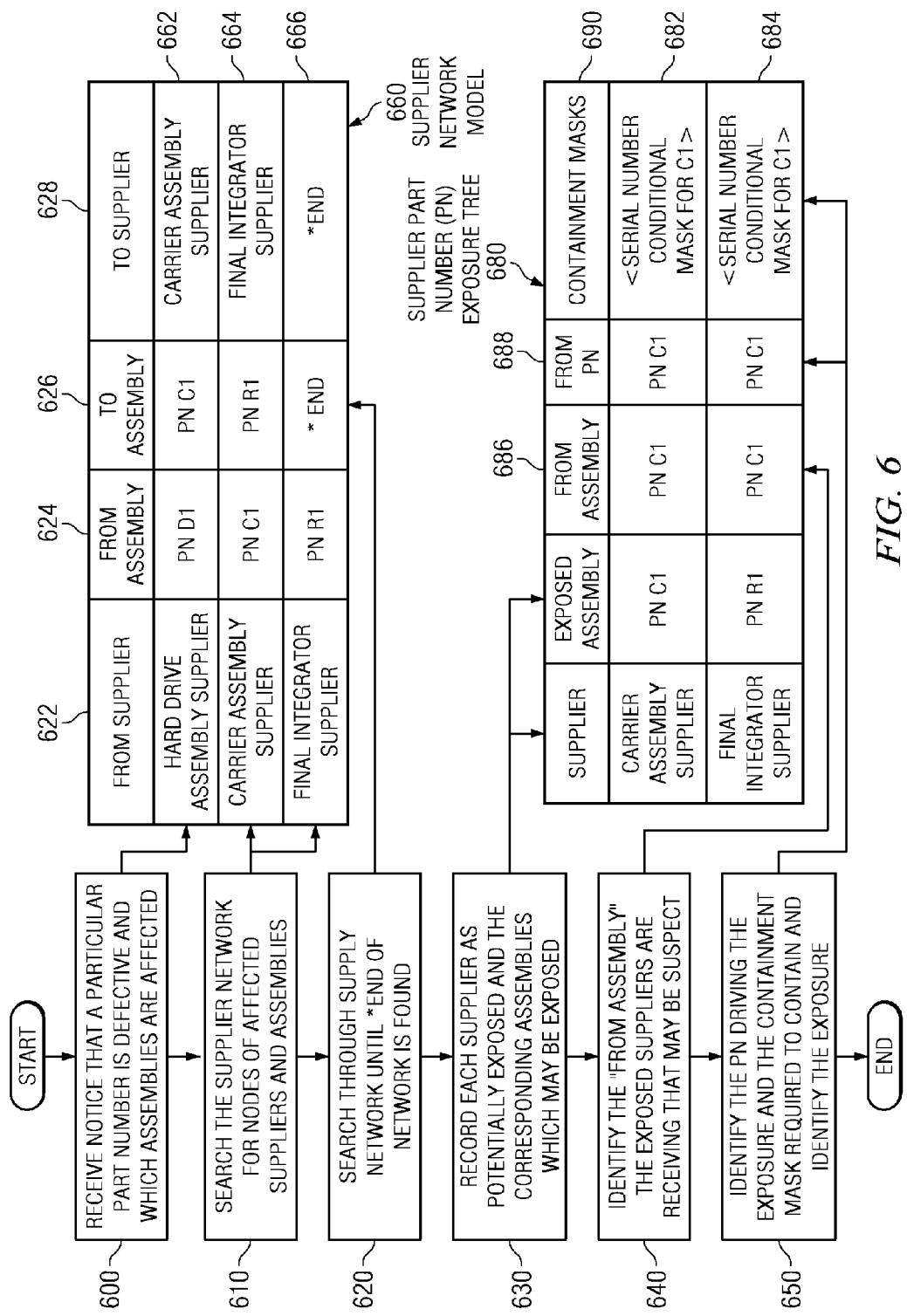
FIG. 6 is a flowchart illustrating the process for tracing a defective product through a supplier network, in accordance with an illustrative embodiment.

FIG. 6 is a flowchart illustrating the process for tracing a defective product through a supplier network, in accordance with an illustrative embodiment. The process can be executed in a serial mask, similar to serial mask 510 of FIG. 5. The following process is exemplary only and the order of the steps may be interchanged without deviating from the scope of the invention.

The process begins with the serial mask receiving a notice that a particular part number is defective and which assemblies are affected by the defective part (step 600). The serial mask then searches for the nodes of the affected suppliers and assemblies (step 610). The supplier network is in a supplier key repository, similar to supplier key repository 516 of FIG. 5. A node is a location or point within the supplier network for a particular supplier. An example supplier network is illustrated in supply chain 300 of FIG. 3. In FIG. 3, each supplier listed in supply chain 300 is a node in a supplier network.

The serial mask then searches through the supply network until the END of the network is found (step 620). The serial mask then records each supplier in the supply network as potentially exposed and the corresponding assemblies which may be exposed (step 630). The serial mask then identifies the "From Assembly" the exposed suppliers are receiving that may be suspect and include the defective part (step 640). The first supplier that originates the defective part is driving the exposure. Thus, the "From Assembly" of the first supplier is the assembly part number or part number (PN) of the first supplier. The supplier mask then identifies the PNs driving the exposure and identifies the containment mask required to contain and identify the exposure (step 650). To contain the exposure means to identify and segregate the assemblies which include the defective product. The process of containing reduces the risk of exposure of the defective product to a customer in the market place. The process terminates thereafter.

Supplier network model 660 and supplier PN exposure tree 680 illustrate the flowchart in use. Supplier network model 660 is similar to supplier network model 410 of FIG. 4, and supplier PN exposure tree is similar to supplier PN exposure trees 430 and 450 of FIG. 4.

Line 662 of supplier network model 660 illustrates step 600. Line 662 indicates that the hard drive assembly supplier notifies the final integrator supplier that assembly PN "D1" in assembly PN "C1" is exposed. Lines 664 and 666 illustrate steps 610 and 620, in which the serial mask searches through supplier network model 660 until the "*END" of the network is found. Supplier PN exposure tree 680 illustrates step 630, in which lines 682 and 684 indicate that the carrier assembly supplier and the final integrator supplier are the exposed suppliers. Additionally, lines 682 and 684 indicate that the assembly at the carrier assembly supplier which is exposed is PN "C1", and the assembly at the final integrator supplier that is exposed is PN "R1". Step 640 is depicted in from assembly column 686, which depicts that PN "C1" is assembly from the hard drive assembly supplier. PN "C1" includes the suspect and defective part. Step 650 is illustrated in columns 688 and 690, in which the PN "C1" is the part driving the exposure and the containment mask associated with PN "C1" is the appropriate conditional mask to narrow the range of serial numbers that includes the defective parts.

FIGS. 7A, 7B, and 7C are an example of the flattening algorithm process, in which an illustrative embodiment may be implemented. The illustrative example can be found in a data element, such as serial number repository 514 of FIG. 5, and created using a flattening algorithm, similar to flattening algorithm 512 of FIG. 5. The illustrative example includes table 700, table 730, and table 750.

Table 700 is a list of entries input by a user into a defective product identification system, such as data processing system 500 of FIG. 5. The user is any individual, supplier, or data processing system that manages the defective product identification system. A user will typically enter entries into table 700 as information regarding good and defective products is determined. Thus, each row of table 700 is a new set of data or information which further narrows and identifies the affected product or products that are defective.

In the illustrative embodiment, table 700 includes sequence of events column 701, supplier column 702, product (exposed assembly) column 703, from assembly column 704, part number (from PN) column 705, range start column 706, range end column 707, algorithm 708, good/bad (G/B) column 709, and conditional check column 710. Sequence of events column 701 is the order in which the events and related entries are entered into table 700. Thus, the information listed in line 712 is the first set of information entered, and the data in line 714 is the second set of information entered. In use, the information in line 712 is typically the first set of information received when a quality issue initially arises. Each subsequent set of information is further information received by the user. In the illustrative embodiment, only two sets of data are entered into table 700.

In an alternative embodiment, sequence of events column 701 may only list a number. In another embodiment, sequence of events column 701 may include more or less text. Additionally, in another embodiment, sequence of events column 701 may be absent from table 700 altogether.

Supplier column 702 lists the supplier from which an exposed assembly or defective part originates. Thus, supplier column 702 lists the supplier that drives the exposure. Supplier column 702 is similar to from supplier column 412 of FIG. 4 or from supplier column 660 of FIG. 6. In the illustrative embodiment, supplier column 702 indicates that the defective parts originate from the hard drive assembly supplier.

Product (exposed assembly) column 703 is the part number of the assembly that includes the defective part or is affected by the defective part listed in part number (from PN) column 705. In other words, product (exposed assembly) column 703 lists the part number of the exposed assembly. Product (exposed assembly) column 703 is similar to exposed assembly columns 432 and 452 of FIG. 4. Product (exposed assembly) column 703 can be any assembly or good which includes the defective part listed in part number (from PN) column 705. In the illustrative embodiment, product (exposed assembly) column 703 indicates that PN "D1" is the exposed assembly.

From assembly column 704 lists the assembly into which the defective part is integrated. From assembly column 704 is similar to from assembly columns 414, 433, and 453 of FIG. 4 and from assembly column 686 of FIG. 6. In the illustrative embodiment, the exposed assembly is from assembly PN "D1".

Part number (from PN) column 705 is a list of the number of the part that is defective or has a quality issue. Part number (from PN) column 705 is similar to from PN columns 434 and 454 of FIG. 4 and from PN column 688 of FIG. 6. In the illustrative embodiment, the originating part number is PN "2", which is listed in line 712 of table 700.

Range start column 706 is the first serial number in a range of serial numbers for each row of entries in lines 712 and 714. Range end column 707 is the last serial number in a range of serial numbers for the corresponding row of entries. Thus, in use, the numbers entered into range start column 706 and range end column 707 are the set of serial numbers affected by the defective part number listed in part number 705. In the illustrative embodiment, line 712 includes a range start of "100" and a range end of "400" and line 714 has a range start of "005" and a range end of "929".

Algorithm column 708 is the type of algorithm used by a specific supplier to identify the numbers in range start column 706 and range end column 707. In the illustrative embodiment, the "numeric" algorithm is listed in algorithm column 708. The "numeric" algorithm is a standard progression of numbers typically used to count different things. Other example types of algorithms include a base octal algorithm, a hexadecimal algorithm, or a binary algorithm. The identification of the type of algorithm used in identifying the range start number and the range end number allows for the accurate identification of defective products.

Good/bad (G/B) column 709 identifies the product status of a product. The product status of a product identifies whether the product is good or defective. If the product listed in range start column 706 and range end column 707 is "good", then a "G" is entered into G/B column 709. On the other hand, if the product listed in range start column 706 and range end column 707 is "defective", then a "B" for bad is entered into G/B column 709. In the illustrative embodiments, line 712 has a product status of "B", and the product status for line 714 is "G".

Conditional check 710 lists any conditional masks that are associated with the particular entry. In the illustrative embodiment, none of the entries indicate a particular conditional mask to be applied to the data in lines 712 and 714.

Tables 730 and 750 illustrate the progression of a serial mask and the application of a flattening algorithm. The flattening algorithm is a three phase process: (1) create the base range; (2) split ranges; and (3) merge adjacent ranges. The split ranges and merge adjacent ranges phases are optional depending on the type of information entered into table 700. The split ranges and merge adjacent ranges phases can also occur in any order, and may occur multiple times in the entire process of flattening or narrowing the range of serial numbers.

Each phase of the flattening algorithm is applied to each supplier downstream of the supplier driving the exposure. Thus, each supplier cycles through the three phases of the flattening algorithm. Therefore, in the illustrative embodiment, the flattening algorithm is applied to the hard drive assembly supplier, the carrier assembly supplier, and the final integrator supplier. If, in an alternative embodiment, a downstream supplier does not use the exposed part or is not affected by the exposed part, then that particular downstream supplier can be excluded from the flattening algorithm. Thus, in that alternative embodiment, only suppliers impacted by the exposure are included in the flattening algorithm. However, in the illustrative embodiment, all suppliers are affected by the exposed part.

In the phase for creating the base range, the flattening algorithm creates the initial set of serial numbers to which the flattening algorithm is applied. Essentially, the base range is a list of all possible products that include a particular part number. In the illustrative embodiment, the flattening algorithm uses line 712 as the initial reference point for creating the base range of numbers. To begin creating the base range, flattening algorithm first determines the beginning range for the base range. The beginning range is the range of serial numbers preceding the range of serial numbers identified in line 712. To identify the beginning range, the flattening algorithm identifies the serial number of the first product in the range of serial numbers. The first serial number can be established by the user, be a default value, or be extracted from another storage device to which defective product identification system connects. In the illustrative embodiment, the range start value is the word "*BEGIN", but in other embodiments, the range start value can be a number.

The flattening algorithm then identifies the range end value or the last serial number of the beginning range. To identify the range end value, the flattening algorithm subtracts one from the range start value of line 712. Thus, in the illustrative embodiment, the flattening algorithm subtracts one from "100" to establish the range end value of the beginning range, 99, as shown in line 731 of Table 730.

After determining the beginning range, the flattening algorithm determines a product status for the product included in the beginning range. The product status is the opposite or the inverted value listed in the "G/B" column of table 700 for line 712. Thus, in the illustrative embodiment, the beginning range is listed as "G" since line 712 indicates that line 712 is identified as "B".

A similar process is used to identify the ending range of the base range of serial numbers, as shown in line 733 of Table 730. Like the range start value of the beginning range, the range end value is established by the user, is a default value, or is a value stored in another storage device. In the illustrative embodiment, the range end value is "*END". The range start value is determined by adding one to the range end value for line 712. Thus, in the illustrative embodiment, one is added to the "400" in line 712 under column 707 to form the number "401".

After the base range is established for the supplier driving the exposure, the base range is cascaded to the downstream suppliers. Thus, the base range listed in lines 731 through 733 is repeated in lines 734 through 736, lines 737 through 739, and lines 740 through 742. In the illustrative embodiment, the base range is listed twice for the final integrator supplier because the final integrator supplier receives the defective part from two suppliers: the hard drive assembly supplier and the carrier assembly supplier.

In the split ranges phase, the flattening algorithm splits the base range into smaller ranges of serial numbers. The flattening algorithm executes the split ranges phase when a subsequent range entry has a range start that falls within the range of serial numbers identified in a preceding sequence, and the subsequent range entry has a product status which is opposite the product status listed in the preceding sequence. For example, consider that another entry in table 700 indicates a range start serial number of "151" that has a product status of "G". Serial number "151" falls within the preceding range of serial numbers listed in line 712 of Table 700. Additionally, the product status of "G" is opposite the product status of "B" for line 712. As a result, in the illustrative embodiment, the flattening algorithm proceeds to execute the split ranges phase, which results in a flattened serial mask. A flattened serial mask is a summary or the result of a comparison using the flattened algorithm, which can be depicted in a number of ways, including but not limited to a table.

In the example, the beginning and ending base ranges are not affected, because the range start value of "151" does not fall within the beginning and ending base ranges. Therefore, lines 731 and 733 and all similar lines from lines 734 through 742 of Table 730 are not changed. Only line 732 and all similar lines from lines 734 through 742 are affected.

To split the range in line 732 of Table 730, the flattening algorithm subtracts one from the range start value of "151" to form the range end value for the range that will precede line 732 and adds one to the range end value of "151" to form the range start value for the range subsequent to line 732. As a result, lines 731 through 733 will have additional entries (not shown) with the following range of serial numbers in each line: BEGIN to 99, 100 to 150, 151 to 151, 152 to 400, and 401 to END. The results of the split range phase for the hard drive assembly supplier is then cascaded to the carrier assembly supplier and the final integrator supplier.

In the third phase, the flattening algorithm merges any adjacent entries or ranges of serial numbers. An adjacent entry is an entry that has a range of serial numbers which is consecutive to another range of serial numbers in another entry and has the same product status. If an adjacent record is found, then the flattening process combines the serial number ranges and deletes the extra entry.

Table 750 illustrates a further narrowing of the serial numbers affected by the exposed part. In table 700, line 714 indicates that the hard drive assembly supplier has narrowed the affected parts to a single assembly. In line 714, the range of serial numbers that are affected are in the range of serial numbers from "005" through "929", and the product status within that range is good or "G".

As in table 730, table 750 iterates through the three phases of the flattening process. Table 750 first creates a base range, then splits the ranges of serial numbers, and then merges any adjacent ranges of serial numbers. Table 750 is the flattened serial mask for table 700.

In another embodiment, the carrier assembly supplier can also supply additional narrowing information. In this embodiment, a similar flattening algorithm analysis will be employed that results in another flattened serial mask.

The illustrative embodiment is not limited to the illustrative example. For example, more or fewer entries can be included in table 700. Furthermore, more or fewer columns can be included in tables 700, 730, and 750. Additionally, all possible entry locations in tables 700 through 750 can be used or can remain empty. Moreover, the information in tables 700 through 750 can also be presented in a different format and organized in a different manner.

Figure 8A:
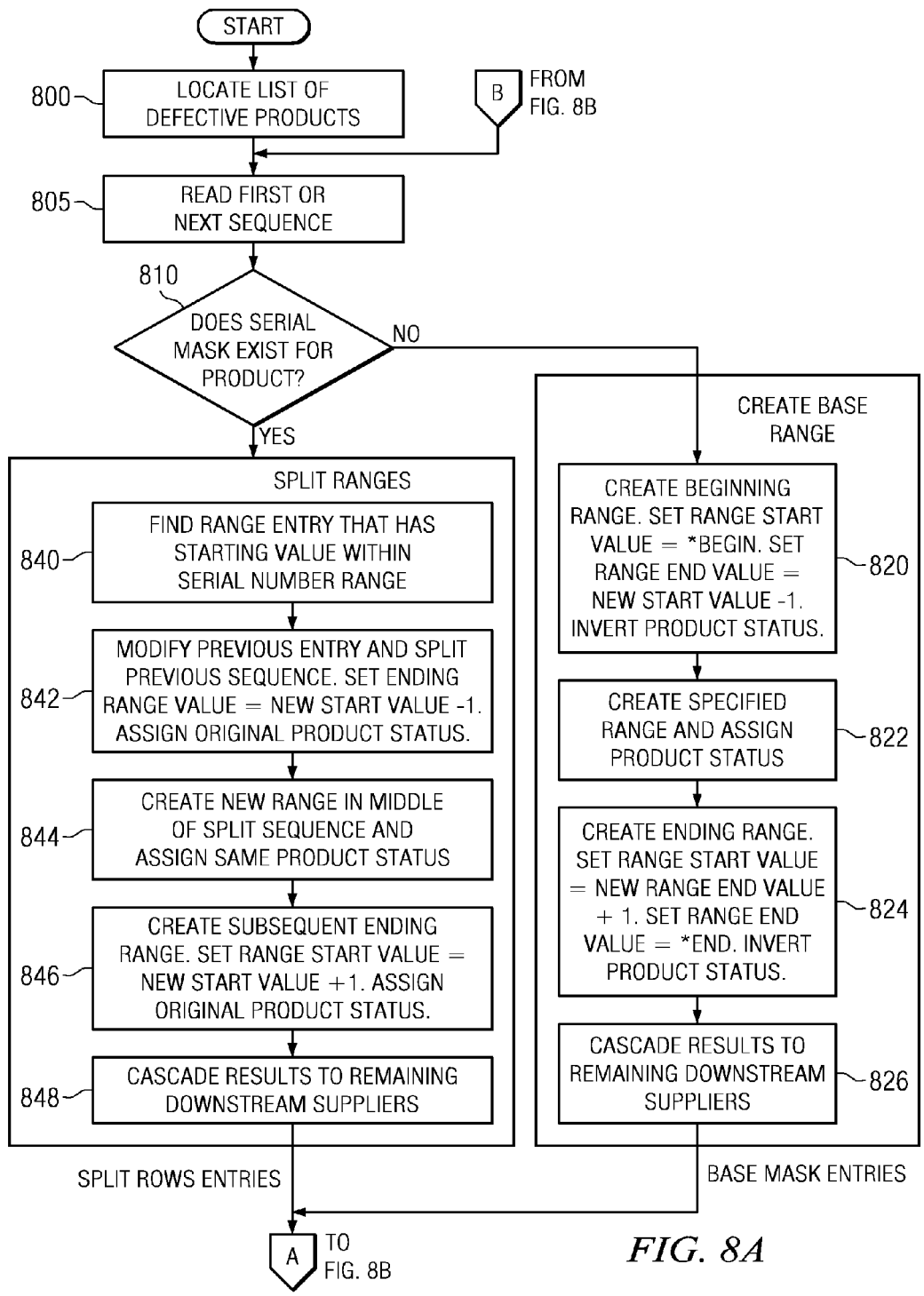
FIGS. 8A and 8B are a flowchart depicting the flattening algorithm process, in which an illustrative embodiment may be implemented.
Figure 8B:
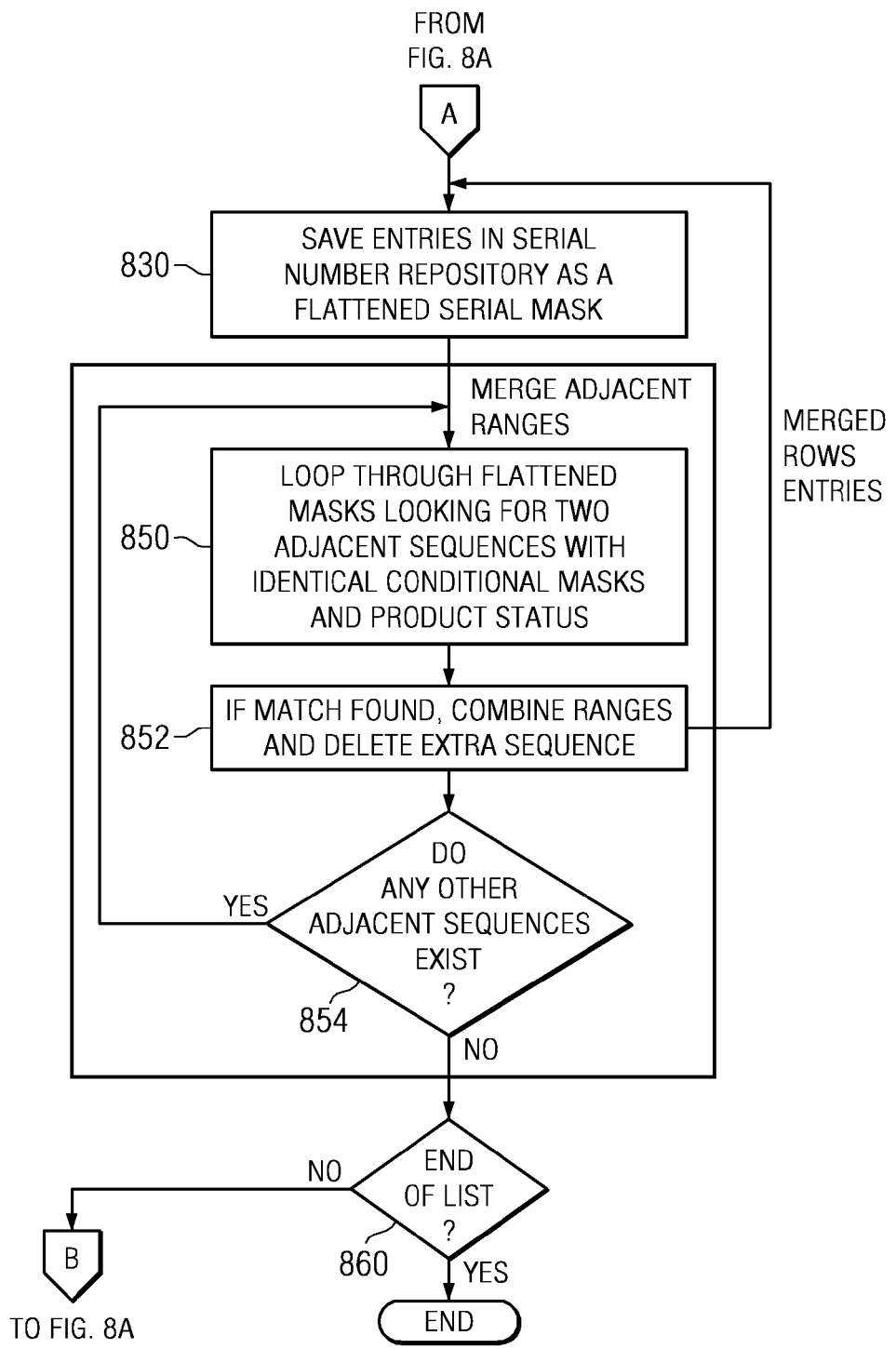

FIGS. 8A and 8B are a flowchart depicting the flattening algorithm process, in which an illustrative embodiment may be implemented. The process can be executed in a flattening algorithm, similar to flattening algorithm 512 of FIG. 5. The following process is exemplary only and the order of the steps may be interchanged without deviating from the scope of the invention.

The process begins with the flattening algorithm locating a list of defective products (step 800). The list is similar to table 700 of FIG. 7A. The flattening algorithm reads either the first or the next sequence in the list of defective products (step 805). If the flattening algorithm is reading the list for the first time, then the flattening algorithm will read the first sequence in the list. If the flattening algorithm is reading the list after the first time, then the flattening algorithm reads the next sequence in the list.

The flattening algorithm then determines whether a serial mask exists for a product with a particular part number (step 810). In other words, the flattening algorithm determines whether the flattening algorithm has already been initiated and a serial mask, as table 750 of FIG. 7C, already exists.

If a serial mask does not already exist ("no" output to step 810), then the flattening algorithm executes the create base range phase. As illustrated by step 820, the flattening algorithm begins the process by creating the beginning range. The flattening algorithm then sets the range start value as "*BEGIN", and then sets the range end value as the start value of the new sequence minus one. Referring to table 700 of FIG. 7A, the range end value is the range start value of line 712 minus one. The flattening algorithm then determines the product status of the base range as the opposite or inverse value of the product status identified in the new sequence.

The flattening algorithm then creates a specified range for the first sequence and assigns the product status for the new sequence (step 822). As shown in step 824, the flattening algorithm then creates the ending range for the base range. The flattening algorithm then sets the range end value as "*END" and sets the range start value as the range end value of the new sequence plus one. The flattening algorithm then determines the product status of the ending range as the opposite or inverse value of the product status identified in the new sequence.

The flattening algorithm then cascades the results to the remaining downstream suppliers in the serial mask (step 826). The flattening algorithm then saves the base ranges in the serial number repository as a flattened serial mask (step 830). In the illustrative embodiment, the flattened serial mask is similar to tables 730 and 750 of FIGS. 7B and 7C, respectively.

Returning to step 810, if the flattening algorithm determines that a serial mask does exist for a particular product with a particular part number ("yes" output to step 810), then the flattening algorithm proceeds through the split ranges phase. The flattening algorithm finds a serial number in the list of defective products that has a starting value within the range of serial numbers of a previous entry (step 840).

As shown in step 842, the flattening algorithm then modifies the previous sequence and splits the previous sequence to form a preceding beginning range. The flattening process maintains the same range start value of the previous sequence as the range start value of the preceding beginning range. The range end value is set by identifying the range start value of the sequence currently being processed and subtracting one from the range start value. The flattening algorithm then assigns the original product status for the existing sequence for the formed preceding beginning range.

As shown by step 844, the flattening algorithm then creates a new range in the middle of the split sequence. The new range is a sequence that is presently being examined. The flattening algorithm then assigns the same product status as recorded in the list of defective products.

As shown by step 846, the flattening algorithm then creates the subsequent ending range. The flattening process maintains the same range end value as the previous sequence. The range start value is the range start value of the current sequence plus one. The flattening algorithm then assigns the original product status.

The flattening algorithm then cascades the results to the remaining downstream suppliers in the serial mask (step 848). The flattening algorithm then saves the entries in the serial number repository as a flattened serial mask (step 830).

The flattening process then begins the phase of merging adjacent ranges. The flattening process begins the process by looping through the flattened serial masks looking for two adjacent sequences, with identical conditional masks and product status (step 850). An adjacent sequence is a sequence that has a range of serial numbers that is consecutive to another range of serial numbers in another sequence. If an adjacent sequence match is found, then the flattening process combines the serial number ranges and deletes the extra sequence (step 852). The merged rows entries are then saved into the serial number repository as a flattened serial mask (step 830).

Returning to step 852, the flattening algorithm then scans through the flattened serial mask to determine whether any other adjacent sequences exist (step 854). If an additional adjacent sequence exists ("yes" output to step 854), then the process repeats by returning to step 850. If no other adjacent sequences exist ("no" output to step 854), then the flattened algorithm determines whether the end of the list has been reached (step 860). If the end of the list has not been reached ("no" output to step 860), then the process returns to step 805 to be repeated. If the end of the list has been reached ("yes" output to step 860), the process terminates thereafter.

Figure 9:
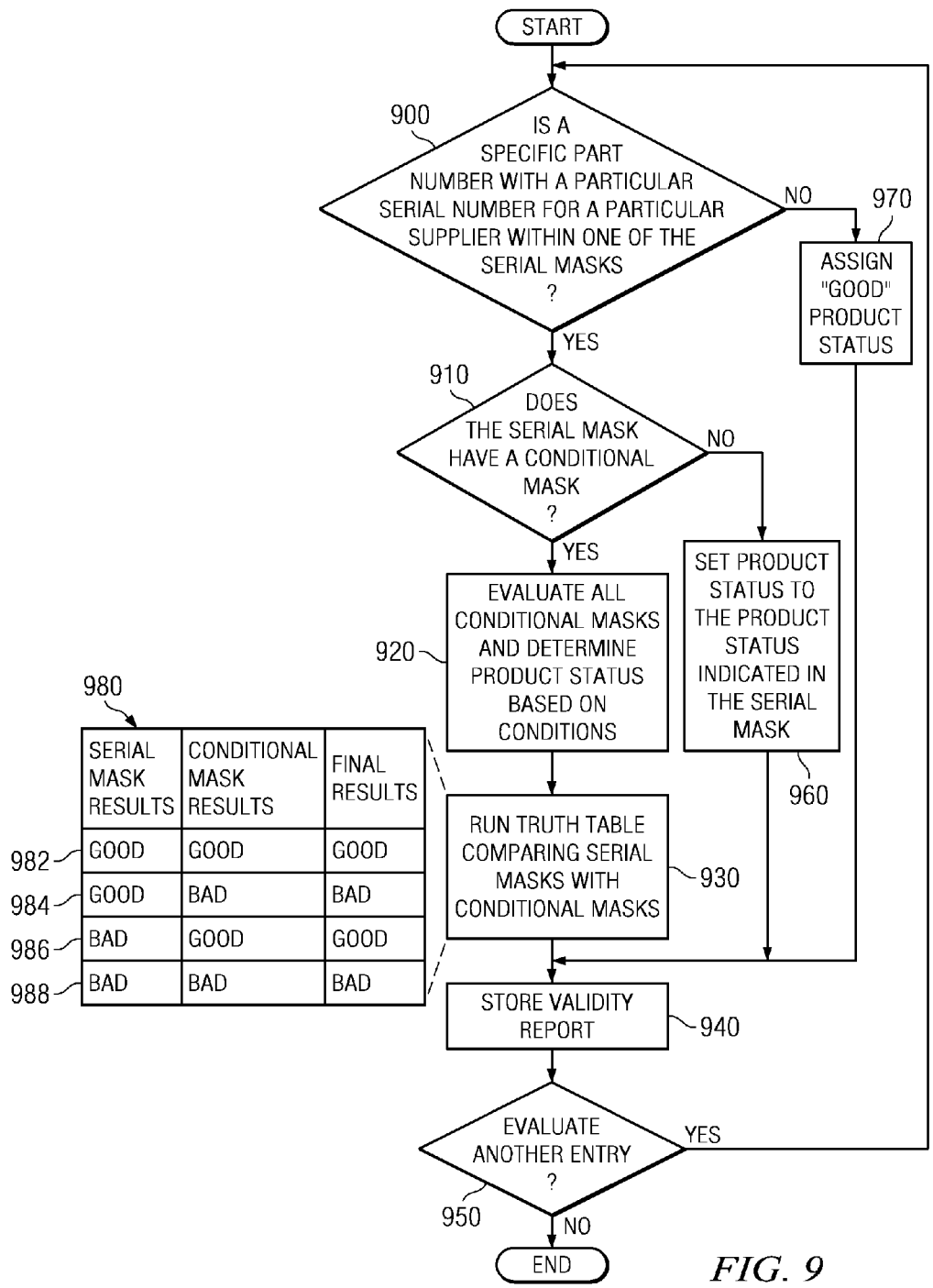
FIG. 9 is a flowchart illustrating the validation process, in which an illustrative embodiment may be implemented.

FIG. 9 is a flowchart illustrating the validation process, in which an illustrative embodiment may be implemented. The illustrated process is executed in a validation engine, similar to validation engine 530 of FIG. 5. The following process is exemplary only and the order of the steps may be interchanged without deviating from the scope of the invention.

The process begins with the validation engine determining whether a product with a specific part number with a particular serial number for a particular supplier is included within one of the serial masks (step 900). If the product is within the serial mask ("yes" output to step 900), then the validation engine determines whether the serial mask has a conditional mask (step 910). If the serial mask has a conditional mask ("yes" output to step 910), then the validation engine evaluates all conditional masks and determines the product status of each product based on the conditions (step 920). The validation engine process then runs a truth table comparing serial masks with the conditional masks (step 930). Table 980 illustrates the truth table used by the validation engine. As shown in truth table 980 in lines 982 and 988, if both the serial mask result and the conditional mask result are the same, then the final result is the same. Thus, in line 982, the final result is "good" because both the serial mask and the conditional mask indicate a "good" product status. In line 988, the final result is "bad" because both the serial mask and the conditional mask indicate a "bad" product status. In the illustrative embodiment, when the product status for a product is different after applying the flattening algorithm and the conditional mask algorithm, conditional masks always take precedence over serial masks. Thus, in lines 984 and 986 of truth table 980, the final result always reflects the conditional mask result. In line 984, the final result is "bad" because the conditional mask has a "bad" product status, and in line 986, the final result is "good" because the conditional mask result has a "good" product status.

The validation engine then stores the validity results in a report (step 940). The validation engine then determines whether another entry needs to be evaluated (step 950). If another entry needs to be evaluated ("yes" output to step 950), then the process repeats and begins again with step 900. If another entry does not need to be evaluated ("no" output to step 950), the process terminates thereafter.

Returning now to step 910, if the validation engine determines that the serial mask does not have a conditional mask ("no" output to step 910), then the validation engine sets the product status to the product status indicated in the serial mask (step 960). The validation engine then stores the results in a report (step 940). The validation engine then determines whether another entry needs to be evaluated (step 950). If another entry needs to be evaluated ("yes" output to step 950), then the process repeats and begins again with step 900. If another entry does not need to be evaluated ("no" output to step 950), the process terminates thereafter.

Returning to step 900, if the product is not within one of the serial masks, then the product is assigned a "good" product status (step 970). The validation engine then stores the results in a report (step 940). The validation engine then determines whether another entry needs to be evaluated (step 950). If another entry needs to be evaluated ("yes" output to step 950), then the process repeats and begins again with step 900. If another entry does not need to be evaluated ("no" output to step 950), the process terminates thereafter.

Figure 10:
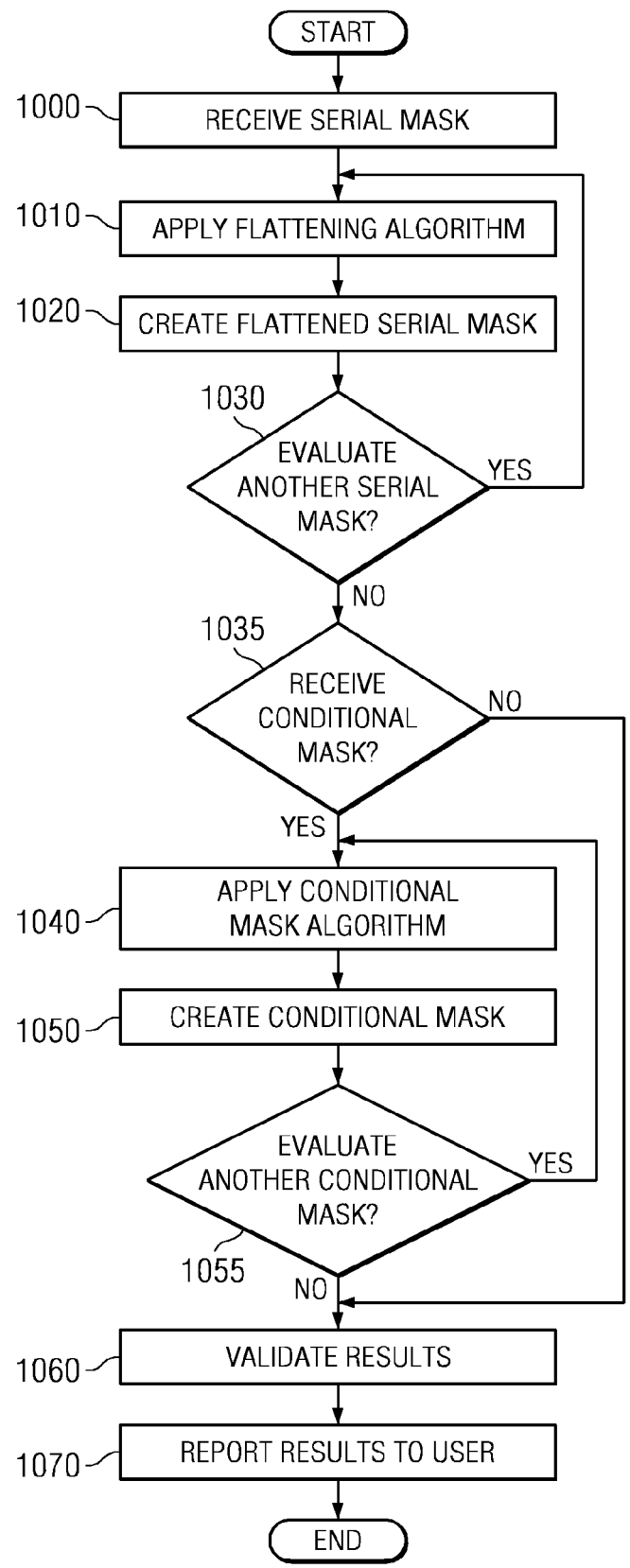
FIG. 10 is a flowchart summarizing the process for identifying a defective product, in which an illustrative embodiment may be implemented.

FIG. 10 is a flowchart summarizing the process for identifying a defective product, in which an illustrative embodiment may be implemented. The process is executed in a defective product identification system, similar to data processing system 500 of FIG. 5. The following process is exemplary only and the order of the steps may be interchanged without deviating from the scope of the invention.

The process begins with the defective product identification system receiving a serial mask (step 1000). The defective product identification system then applies the flattening algorithm to the serial mask (step 1010). The defective product identification system then creates a flattened serial mask (step 1020). In an alternative embodiment, the defective product identification system can also automatically notify all the suppliers in the supplier network who are affected by the suspect product.

The defective product identification system then determines whether another serial mask needs to be evaluated (step 1030). If another serial mask needs to be evaluated ("yes" output to step 1030), then the process repeats beginning with step 1010. If another serial mask does not need to be evaluated ("no" output to step 1030), then the defective product identification system determines whether a conditional mask is received (step 1035).

If a conditional mask is received ("yes" output to step 1035), then the defective product identification system applies the conditional mask algorithm (step 1040). The defective product identification system then creates the conditional mask (step 1050) and determines whether another conditional mask is to be evaluated (step 1055). If another conditional mask is to be evaluated ("yes" output to step 1055), then the process repeats beginning with step 1040. If another conditional mask is not to be evaluated ("no" output to step 1055), then the defective product identification system validates the results (step 1060). The results are then reported to the user (step 1070), with the process terminating thereafter.

Returning to step 1035, if a conditional mask is not received ("no" output to step 1035), then the defective product identification system validates the results (step 1060). The results are then reported to the user (step 1070), with the process terminating thereafter.

In an alternative embodiment, the process of validation in step 1060 and reporting results to the user in step 1070 can repeat. In other words, the defective product identification system can validate results multiple times and report results to a user multiple times. The implementation of repeating steps 1060 and 1070 can optionally be determined by the user.

Thus, the illustrative embodiments provide a computer implemented method, an apparatus, and computer usable program product for containing a defective product across a supply chain. A data processing system receives a notice from a source supplier that a product is defective. The data processing system identifies an exposure level associated with the defective product. The exposure level includes a list of affected assemblies and a range of serial numbers associated with the affected assemblies.

To identify the exposure level, the data processing system determines which suppliers in the supply chain and which assemblies produced by the suppliers are affected by the defective product. To determine which suppliers and which assemblies are affected, the data processing system identifies a node in a supplier network for each supplier affected by the defective product. The data processing system then searches through the supplier network until an end of the supply chain is identified. The data processing system then records each supplier and the assemblies affected by the defective product to form a list of exposed suppliers and a list of exposed assemblies. The data processing system then identifies a "from" assembly from which the exposed assemblies are formed. The data processing system then identifies a part number for the defective product.

To continue identifying the exposure level, the data processing system then applies a flattening algorithm to the list of affected assemblies and the range of serial numbers. The flattening algorithm involves three steps: (1) creating a base range of serial numbers; (2) splitting the range of serial numbers; and (3) merging adjacent ranges of serial numbers. The application of the range flattening algorithm forms a serial mask that identifies a narrowed range of serial numbers. The data processing system can then apply a conditional algorithm to the range of serial numbers to narrow the range of serial numbers. The application of the conditional mask algorithm forms conditional mask results. The data processing system then validates the serial mask against the conditional mask results.

After identifying the exposure level, the data processing system notifies each supplier in the supply chain of the defective product. To notify, the data processing system identifies a containment mask that narrows the exposure level to a part number for the defective product. Then, the containment mask is applied to the range of serial numbers to form a narrowed range of serial numbers. The narrowed range of serial numbers is then communicated to the suppliers. In one embodiment, the suppliers are only notified after the exposure level is identified. In another embodiment, the suppliers are also notified when each step of the flattening algorithm is applied to the range of serial numbers. Additionally, in one embodiment, the suppliers are notified by using a form of a serial number stored in the data processing system. In another embodiment, the suppliers are notified by using a form of serial numbers, the form being unique to each supplier.

The illustrative embodiments provide a computer implemented method, an apparatus, and a computer usable program code for containing a defective product across a supply chain. The illustrative embodiments allow for the quick identification of affected assemblies, which may include a defective part which is buried deep inside the assembly. The illustrative embodiments also allow for the final integrator supplier to communicate affected part numbers using the serial number format of a particular supplier. As a result, each supplier in the supply chain is notified of the affected parts in the supplier's own "part number language". Moreover, the illustrative embodiments automatically notify suppliers of a part number and associated assemblies that are affected by the exposed part. Therefore, containment activities at the supplier can occur in almost real-time. In addition, the illustrative embodiments allow for part numbers, assemblies, serial numbers, and supplier relationships to be controlled and managed upstream and downstream of a particular supplier.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for containing a defective product across a supply chain, the computer implemented method comprising:
   receiving, by a data processing system, a notice from a source supplier that a product is defective;
   identifying, by the data processing system, an exposure level associated with the defective product, wherein the exposure level comprises a list of affected assemblies and a range of a plurality of consecutive serial numbers associated with the affected assemblies;
   applying, by the data processing system, a flattening algorithm to the list of affected assemblies associated with the defective product and the range of the plurality of consecutive serial numbers associated with the affected assemblies to narrow the range of the plurality of consecutive serial numbers associated with the affected assemblies by modifying a table having a plurality of entries, each entry identifying a set of consecutive serial numbers and a product status associated with each set of consecutive serial number, wherein modifying the table comprises creating a first range of consecutive serial numbers that includes an identified starting serial number and an identified ending serial number based on a first entry in the table, splitting the first range of consecutive serial numbers into a plurality of smaller ranges of consecutive serial numbers when a second entry in the table includes a second range of consecutive serial numbers with a range start that falls between the identified starting serial number and the identified ending serial number of the first range of consecutive serial numbers and the second range of consecutive serial numbers has a product status opposite of the first range of consecutive serial numbers, wherein the plurality of smaller ranges includes ranges of serial numbers from the first entry that are not in the second entry, creating new entries in the table corresponding to the plurality of the smaller ranges, and replacing the first entry in the table with the new entries and the second entry, and merging entries in the table when a first range of consecutive serial numbers is consecutive to a second range of consecutive serial numbers having a same product status, wherein the splitting and the merging are performed for other entries in the table based on the set of consecutive serial numbers and the product status identified in each of the other entries; and
   responsive to identifying the exposure level, notifying, by the data processing system, each supplier in the supply chain of the defective product.

2. The computer implemented method of claim 1, wherein the step of identifying an exposure level associated with the defective product comprises:
   determining which suppliers in the supply chain and which assemblies produced by the suppliers are affected by the defective product; and
   applying a conditional mask algorithm to a range of consecutive serial numbers to further narrow the range of consecutive serial numbers.

3. The computer implemented method of claim 2, wherein the step of determining which suppliers in the supply chain and which assemblies produced by the suppliers are affected by the defective product comprises:
   identifying a node in a supplier network for the each supplier affected by the defective product;
   searching the supplier network until an end of the supply chain is identified;
   recording the each supplier and the assemblies affected by the defective product to form a list of exposed suppliers and a list of exposed assemblies;
   identifying a from assembly from which the exposed assemblies are formed; and
   identifying a part number for the defective product.

4. The computer implemented method of claim 2, further comprising:
   responsive to applying the flattening algorithm, forming a serial mask that identifies a narrowed range of consecutive serial numbers;
   responsive to applying the conditional mask algorithm, forming conditional mask results; and
   validating the serial mask against the conditional mask results.

5. The computer implemented method of claim 1, further comprising:
   responsive to at least one of the creating, the splitting, and the merging, notifying the each supplier in the supply chain of a changed range of serial numbers.

6. The computer implemented method of claim 1, wherein the step of notifying each supplier in the supply chain of the defective product comprises:
   identifying a containment mask which narrows the exposure level to a part number for the defective product;
   applying the containment mask to a range of consecutive serial numbers to form a narrowed range of consecutive serial numbers; and
   communicating the narrowed range of consecutive serial numbers to the each supplier.

7. The computer implemented method of claim 1, wherein the step of notifying each supplier in the supply chain of the defective product comprises notifying each supplier using a form of serial numbers unique to the each supplier.

8. A data processing system for containing a defective product across a supply chain, the data processing system comprising:
   a bus system;
   a storage device connected to the bus system, wherein the storage device stores a set of instructions; and
   a processing unit connected to the bus system, wherein the processing unit executes the set of instructions to:
   receive a notice from a source supplier that a product is defective; identify an exposure level associated with the defective product, wherein the exposure level comprises a list of affected assemblies and a range of a plurality of consecutive serial numbers associated with the affected assemblies;
   apply a flattening algorithm to the list of affected assemblies associated with the defective product and the range of the plurality of consecutive serial numbers associated with the affected assemblies to narrow the range of the plurality of consecutive serial numbers associated with the affected assemblies by modifying a table having a plurality of entries, each entry identifying a set of consecutive serial numbers and a product status associated with each set of consecutive serial number, wherein modifying the table comprises creating a first range of consecutive serial numbers that includes an identified starting serial number and an identified ending serial number based on a first entry in the table, splitting the first range of consecutive serial numbers into a plurality of smaller ranges of consecutive serial numbers when a second entry in the table includes a second range of consecutive serial numbers with a range start that falls between the identified starting serial number and the identified ending serial number of the first range of consecutive serial numbers and the second range of consecutive serial numbers has a product status opposite of the first range of consecutive serial numbers, wherein the plurality of smaller ranges includes ranges of serial numbers from the first entry that are not in the second entry, creating new entries in the table corresponding to the plurality of the smaller ranges, and replacing the first entry in the table with the new entries and the second entry, and merging entries in the table when a first range of consecutive serial numbers is consecutive to a second range of consecutive serial numbers having a same product status, wherein the splitting and the merging are performed for other entries in the table based on the set of consecutive serial numbers and the product status identified in each of the other entries; and notify each supplier in the supply chain of the defective product in response to identifying the exposure level.

9. The data processing system of claim 8, wherein the processing unit executes a further set of instructions to:

determine which suppliers in the supply chain and which assemblies produced by the supplier are affected by the defective product; and apply a conditional mask algorithm to a range of consecutive serial numbers to further narrow the range of consecutive serial numbers.

10. A computer program product comprising a computer readable storage medium including computer usable program code for containing a defective product across a supply chain, the computer program product comprising:

computer usable program code for receiving a notice from a source supplier that a product is defective;

computer usable program code for identifying an exposure level associated with the defective product, wherein the exposure level comprises a list of affected assemblies and a range of a plurality of consecutive serial numbers associated with the affected assemblies;

computer usable program code for applying a flattening algorithm to the list of affected assemblies associated with the defective product and the range of the plurality of consecutive serial numbers associated with the affected assemblies to narrow the range of the plurality of consecutive serial numbers associated with the affected assemblies by modifying a table having a plurality of entries, each entry identifying a set of consecutive serial numbers and a product status associated with each set of consecutive serial number, wherein modifying the table comprises creating a first range of consecutive serial numbers that includes an identified starting serial number and an identified ending serial number based on a first entry in the table, splitting the first range of consecutive serial numbers into a plurality of smaller ranges of consecutive serial numbers when a second entry in the table includes a second range of consecutive serial numbers with a range start that falls between the identified starting serial number and the identified ending serial number of the first range of consecutive serial numbers and the second range of consecutive serial numbers has a product status opposite of the first range of consecutive serial numbers, wherein the plurality of smaller ranges includes ranges of serial numbers from the first entry that are not in the second entry, creating new entries in the table corresponding to the plurality of the smaller ranges, and replacing the first entry in the table with the new entries and the second entry, and merging entries in the table when a first range of consecutive serial numbers is consecutive to a second range of consecutive serial numbers having a same product status, wherein the splitting and the merging are performed for other entries in the table based on the set of consecutive serial numbers and the product status identified in each of the other entries; and responsive to identifying the exposure level, computer usable program code for notifying each supplier in the supply chain of the defective product.

11. The computer program product of claim 10, wherein the computer usable program code for identifying an exposure level associated with the defective product comprises:

computer usable program code for determining which suppliers in the supply chain and which assemblies produced by the suppliers are affected by the defective product;

and computer usable program code for applying a conditional mask algorithm to a range of consecutive serial numbers to further narrow the range of consecutive serial numbers.

12. The computer program product of claim 11, wherein the computer usable program code for determining which suppliers in the supply chain and which assemblies produced by the suppliers are affected by the defective product comprises:

computer usable program code for identifying a node in a supplier network for the each supplier affected by the defective product;

computer usable program code for searching the supplier network until an end of the supply chain is identified;

computer usable program code for recording the each supplier and the assemblies affected by the defective product to form a list of exposed suppliers and a list of exposed assemblies;

computer usable program code for identifying a from assembly from which the exposed assemblies are formed; and computer usable program code for identifying a part number for the defective product.

13. The computer program product of claim 11, further comprising:

responsive to applying the flattening algorithm, computer usable program code for forming a serial mask that identifies a narrowed range of consecutive serial numbers;

responsive to applying the conditional mask algorithm, computer usable program code for forming conditional mask results; and computer usable program code for validating the serial mask against the conditional mask results.

14. The computer program product of claim 10, further comprising:

responsive to at least one of the creating, the splitting, and the merging, computer usable program code for notifying the each supplier in the supply chain of a changed range of serial numbers.

15. The computer program product of claim 10, wherein the computer usable program code for notifying each supplier in the supply chain of the defective product comprises:

computer usable program code for identifying a containment mask which narrows the exposure level to a part number for the defective product;

computer usable program code for applying the containment mask to a range of consecutive serial numbers to form a narrowed range of consecutive serial numbers; and computer usable program code for communicating the narrowed range of consecutive serial numbers to the each supplier.

16. The computer program product of claim 10, wherein the computer usable program code for notifying comprises notifying each supplier using a form of serial numbers unique to the each supplier.

17. A data processing system for containing a defective product across a supply chain, the data processing system comprising:
- a means for receiving a notice from a source supplier that a product is defective; a means for identifying an exposure level associated with the defective product, wherein the exposure level comprises a list of affected assemblies and a range of a plurality of consecutive serial numbers associated with the affected assemblies;
- a means for applying a flattening algorithm to the list of affected assemblies associated with the defective product and the range of the plurality of consecutive serial numbers associated with the affected assemblies to narrow the range of the plurality of consecutive serial numbers associated with the affected assemblies by modifying a table having a plurality of entries, each entry identifying a set of consecutive serial numbers and a product status associated with each set of consecutive serial number, wherein modifying the table comprises creating a first range of consecutive serial numbers that includes an identified starting serial number and an identified ending serial number based on a first entry in the table, splitting the first range of consecutive serial numbers into a plurality of smaller ranges of consecutive serial numbers when a second entry in the table includes a second range of consecutive serial numbers with a range start that falls between the identified starting serial number and the identified ending serial number of the first range of consecutive serial numbers and the second range of consecutive serial numbers has a product status opposite of the first range of consecutive serial numbers, wherein the plurality of smaller ranges includes ranges of serial numbers from the first entry that are not in the second entry, creating new entries in the table corresponding to the plurality of the smaller ranges, and replacing the first entry in the table with the new entries and the second entry, and merging entries in the table when a first range of consecutive serial numbers is consecutive to a second range of consecutive serial numbers having a same product status, wherein the splitting and the merging are performed for other entries in the table based on the set of consecutive serial numbers and the product status identified in each of the other entries; and
- responsive to identifying the exposure level, a means for notifying each supplier in the supply chain of the defective product.

18. The data processing system of claim 17, wherein the means for identifying an exposure level associated with the defective product comprises:
- a means for determining which suppliers in the supply chain and which assemblies produced by the suppliers are affected by the defective product; and
- a means for applying a conditional mask algorithm to a range of consecutive serial numbers to further narrow the range of consecutive serial numbers.

* * * * *